UNITED STATES PATENT OFFICE.

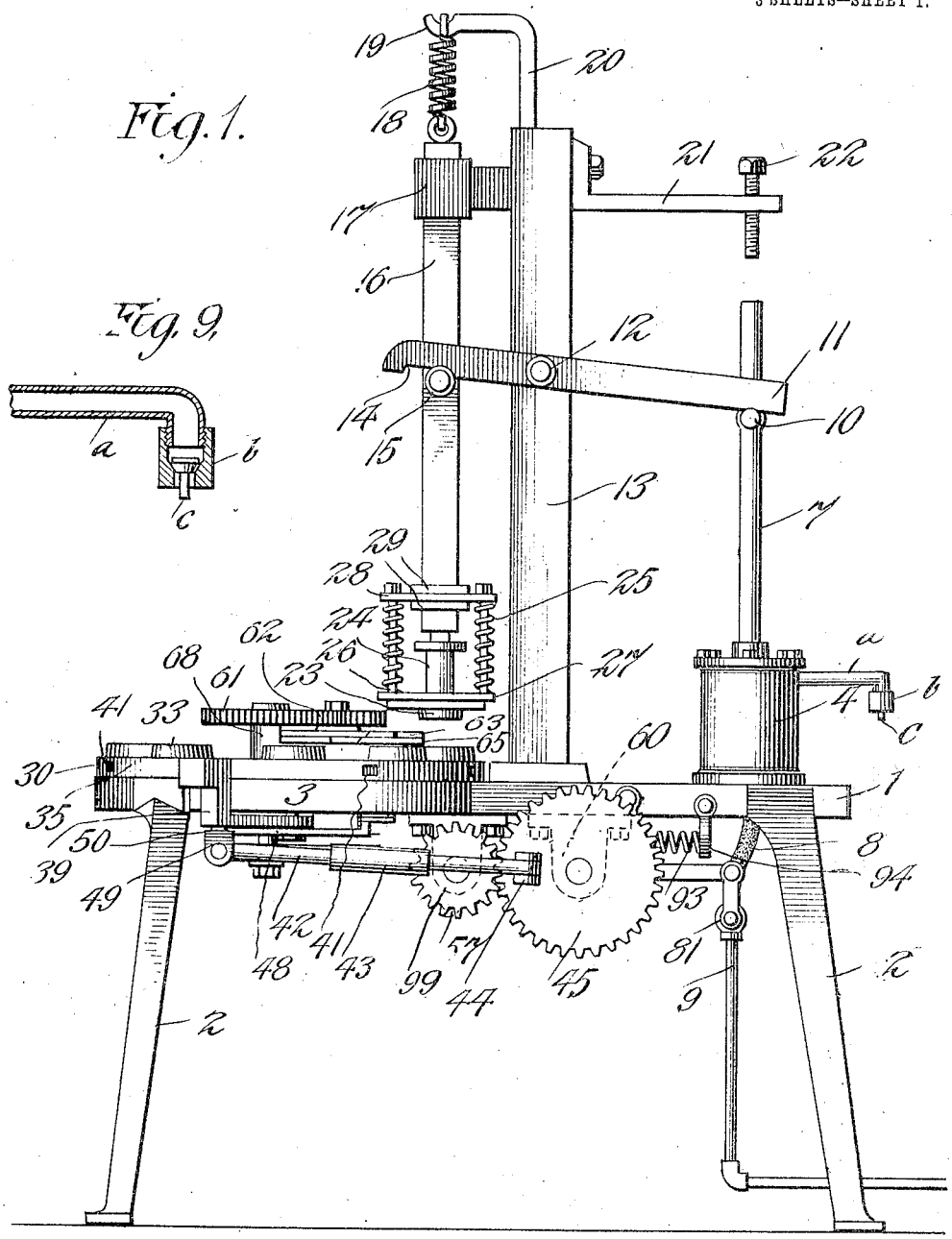

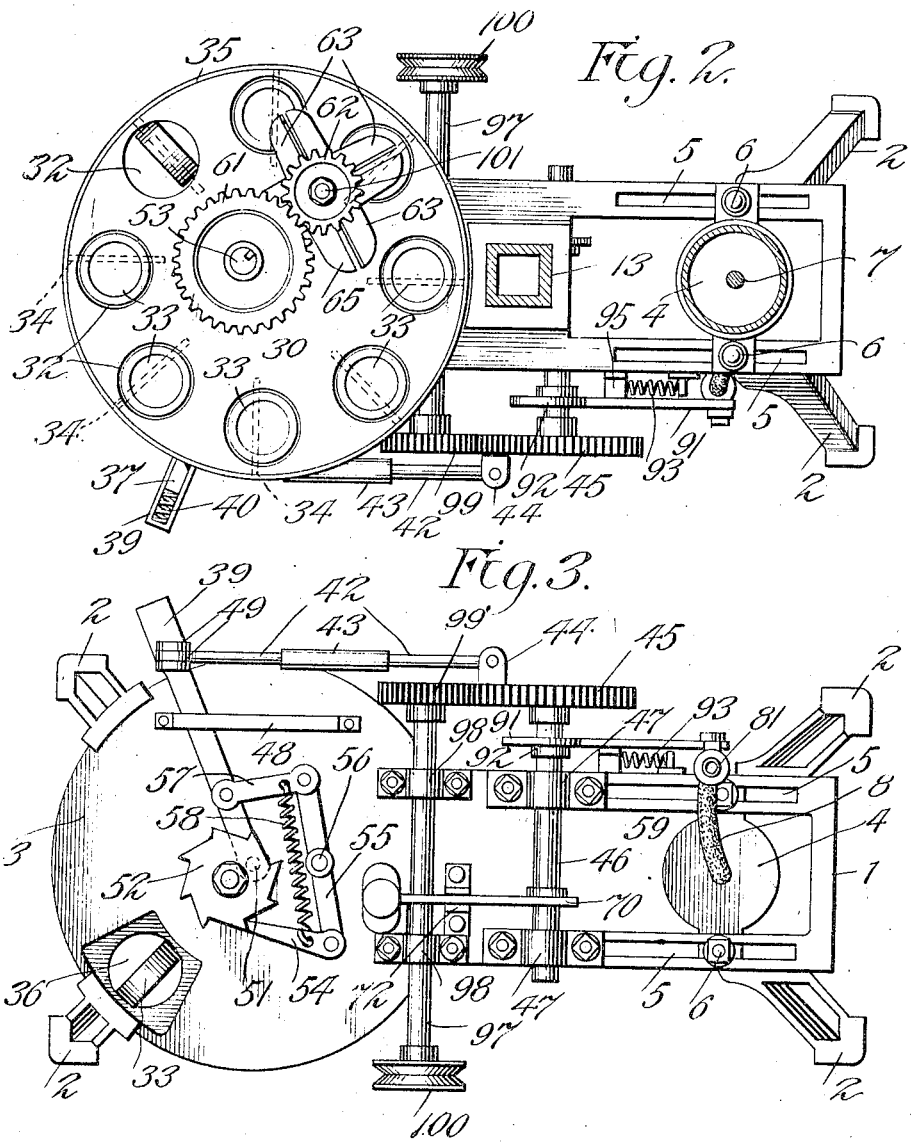

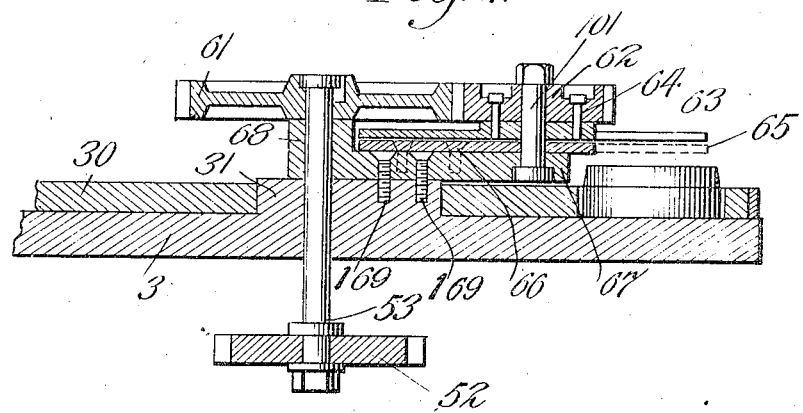
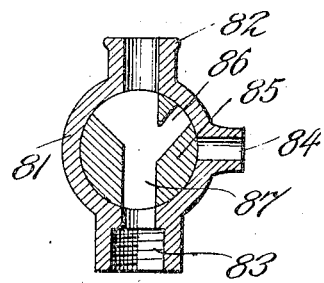
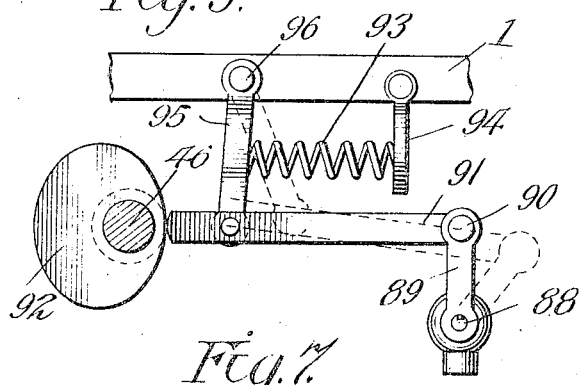
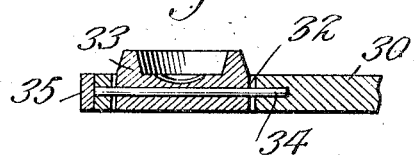
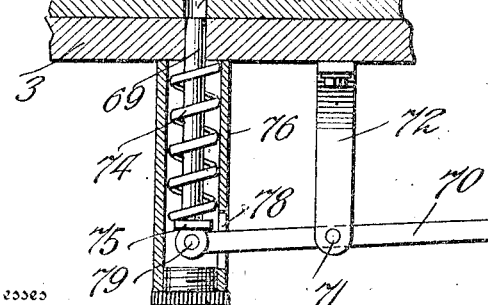

FRANK J. HOUK, OF COFFEYVILLE, KANSAS.

GLASS-MOLDING MACHINE.

No. 893,500.   Specification of Letters Patent.   Patented July 14, 1908.

Application filed March 21, 1907. Serial No. 363,612.

*To all whom it may concern:*

Be it known that I, FRANK J. HOUK, a citizen of the United States of America, residing at Coffeyville, in the county of Montgomery and State of Kansas, have invented new and useful Improvements in Glass-Molding Machines, of which the following is a specification.

This invention relates to glass molding machines designed more particularly for molding white glass linings for fruit jar caps, and one of the principal objects of the same is to provide simple and efficient means for discharging the linings automatically after they have been molded and sufficiently cooled.

Another object of the invention is to provide novel and efficient means for cutting off the supply of glass to the mold automatically.

Still another object of the invention is to improve the general construction of machines of this character with a view to simplifying the construction and rendering the machine more simple and more efficient in operation.

These and other objects may be attained by means of the construction illustrated in the accompanying drawings, in which:

Figure 1 is a side elevation of a machine made in accordance with my invention. Fig. 2 is a top plan view of the turn-table and a horizontal section of the cylinder and the vertical column for supporting the plunger. Fig. 3 is a bottom plan view of the table for supporting the operative parts. Fig. 4 is a detail sectional view taken through one of the molds, and through the cut-off device for the glass supply. Fig. 5 is a detail view of the valve operating mechanism. Fig. 6 is a sectional view of the valve. Fig. 7 is a detail view showing the means for locking the turn-table. Fig. 8 is a sectional view through one of the molds, and showing the manner in which it is pivoted to the turn-table. Fig. 9 is a detail sectional view of the cylinder check valve.

Referring to the drawings for a more particular description of my invention, the numeral 1 designates a table supported upon legs 2, said table having a rounded end 3 upon which the turn-table is supported. Mounted upon the opposite end of the table 1 is a cylinder 4, said cylinder being adjustable longitudinally of the table by means of guideways 5 disposed upon opposite sides of the table, and adjusting bolts 6 extending through the guideways and fitted with nuts, said bolts extending through lugs formed upon the bottom of the cylinder 4. A piston of ordinary construction is mounted within the cylinder 4 and the piston rod 7 extends upward through the cylinder head. Connected to the bottom of the cylinder is a flexible tube 8, the lower end of which communicates with an air supply pipe 9 which leads to any suitable compressed air supply.

Extending laterally from the piston rod 7 is a stud 10 upon which rests the outer end of a lever 11 pivoted at 12 upon a hollow column 13 secured at its base to the table 1. The outer end of the lever 11 is notched, as at 14, to engage a roller stud 15 extending laterally from a plunger 16 supported at its upper end in a bearing 17 projecting from the column 13, and a spiral spring 18 is connected to the upper end of the plunger, and the opposite end of said spring is supported upon a hook 19 formed upon a bracket 20 supported upon the column 13. A bracket 21 is secured to the column 13 and is provided with a stop screw 22 disposed in alinement with the piston rod 7 to limit the upward throw of the piston in an obvious manner. At the lower end of the plunger 16, a plunger head 23 provided with a sleeve 24 is mounted to slide upon said plunger against the tension of springs 25 which encircle rods 26 connecting the plates 27, 28, the plate 27 being connected to the sleeve 24, and the plate 28 being secured to the plunger 16 by means of plates 29 disposed upon opposite sides of said plate 28 and secured in any suitable manner to the plunger 16.

A turn-table 30 is mounted to rotate upon a boss 31 formed upon the upper surface of the rounded portion 3 of the table 1, said turn-table having a series of openings 32 therein arranged near its peripheral outer edge. Pivotally mounted in each of the openings 32 is a mold cup 33. The pintle or rod 34 upon which the mold cups 33 are pivoted extends eccentrically through the mold cup and the ends of said pintles are supported, as shown in the turn-table, and a ring 35 encircles the periphery of the turn-table to hold the pintles 34 in place, thus permitting the molds to be readily removed and replaced by others whenever required. The mold cups 33 being pivoted eccentrically are permitted to discharge the molded article automatically by gravity through an opening 36 in the rounded portion 3 of the table 1, as shown more particularly in Figs. 2 and 3. The turn-table 30 is intermittently rotated by means of a bolt 37 mounted in the hollow outer end of a lever 39 and provided with a spring 40 which acts upon the bolt 37 to engage the latter with a series of openings 41 in the ring 35 which encircles the turn table. The lever 39 is reciprocated by means of a connecting rod 42, the meeting ends of which are adjustable by means of a turn buckle 43, said connecting rod being attached to a stud 44 pivotally connected to a gear wheel 45 mounted upon a shaft 46 journaled in brackets 47 secured underneath the table 1. The lever 39 is guided in its movement by a keeper 48 secured underneath the rounded portion 3 of the table 1. The connecting rod 42 is pivoted between lugs 49 provided with a stud 50 which is pivoted to the lever 39. The inner end of the lever 39 is pivoted at 51 to the table, and a ratchet wheel 52 mounted upon the lower end of a shaft 53, and a pawl 54 for operating said ratchet wheel is connected to a link 55 pivoted at 56, and provided with a link 57 pivoted to the link 55 and to the lever 39. A spring 58 is connected at one end to the link 57 and at the other end to the pawl 54.

A pipe $a$ is secured to the cylinder 4, and at its downwardly turned end a valve seat $b$ is connected thereto to accommodate a check valve $c$. When the air is admitted and the piston 7 rises, the valve closes to give the piston a slow and steady motion, and when the piston starts downward, the valve admits air and the piston rises quickly.

Connected to the upper end of the shaft 53 is a gear wheel 61, the teeth of which engage the teeth of a pinion 62, and secured to the undersurface of the pinion 62 are the radial cutter blades 63, four such blades being shown, and said blades being formed integrally and secured by means of pins 64 to the pinion 62. The stationary cutter blades 65 which correspond in contour and number to the blades 63 are secured by means of screws 66 to an extension 67 on the hub 68 which is secured by screws 169 to the boss 31 upon the rounded portion 3 of the table 1. Thus the cutter blades 33 are rotated to pass the cutting edges of the blades 65 to cut off the flow of glass into the mold. The stationary cutter blades may be adjusted to present any one of the four to the action of the rotating cutter blades 63 when one of said blades becomes dull.

To hold the turn-table in rigid position during the molding operation a bolt 69 (Fig. 7) is pivotally connected to a lever 70 pivoted at 71 upon a bracket 72 depending from the under side of the table 3, said bolt 69 having its upper end projected through an opening in said table and into a series of sockets 73 formed in the underside of the turn-table 30. A spring 74 encircling the bolt 69 bears at one end against the under surface of the table 3 and its opposite end bears against a collar 75 on the bolt, the tension of said spring being exerted to withdraw the bolt from the socket 73. The bolt 69 and the spring 74 are mounted in a tubular housing 76 depending from the table 3 and provided with a screw plug 77 which closes the lower end of the housing 76. The lever 70 projects through a slot 78 in the housing 76 and is pivotally connected at 79 to the bolt 69, the opposite end of said lever 70 being operated upon by a cam 80 on the shaft 46 to project the bolt 69 into the sockets 73.

A valve 81 (Fig. 6) comprising a casing to one end of which the flexible tube 8 is secured at 82, is provided with a threaded connection 83 to which the inlet pipe 9 is secured, and an exhaust port 84 is provided in said casing. The rotary valve 85 is provided with an exhaust port 86 and an opening 87 extending through the valve to establish communication between the pipe 9 and the flexible tube 8. Extending from the valve 85 is a pin 88 connected to a link 89 and said link is pivoted at 90 to a lever 91 actuated by a cam 92 on the shaft 46. The movement of the lever 91 opens and closes the valve 85 to operate the piston rod 7, as will be understood, and a spring 93 (Fig. 5) bears at one end against a lug 94 secured to the table 1, and the opposite end of said spring 93 bearing against a pivoted link 95 connected to the lever 91 at one end and at 96 to a pin projecting from the table 1. A drive shaft 97 is journaled in hangers 98 secured underneath the table, one end of said shaft having secured thereto a gear wheel 99 which meshes with the gear wheel 45, and the opposite end of said shaft carrying a grooved pulley 100 to receive a belt from any suitable source of power. The pinion 62 is mounted upon a stub shaft 101 rising from the extension 67 of the hub 68.

The operation of my invention may be briefly described as follows: Molten glass is fed into the molds 33 when the cutting blades 63, 65 are separated above the mold. The revolving cutters 63 are operated to cut off the glass above the surface of the mold. When the table is rotated the bolt 69 is projected within one of the sockets 73 in the rotating table to hold one of the molds in alinement with the plunger 16 at which time the valve 85 is turned to a position to establish communication between the pipe 9 and the cylinder 4 to raise the piston rod 7 and depress the plunger 23 within the mold 33. A further rotation of the shaft 46 will permit the bolt 69 to be withdrawn from the socket 73 and said table is turned to present the next mold 33 to the plunger 16. When the mold with the article molded therein has been moved to the point coincident with the opening 36 in the table 3, the heavier side of the mold drops by gravity and discharges the molded article therefrom into a suitable receptacle placed below said opening. A further movement of the turn-table will move the mold 33 to a horizontal position to rest upon the surface of the table 3 in an obvious manner.

Any suitable power may be utilized for operating the machine and if desired the cut-off mechanism may be operated by separate means or power like an electric motor if found desirable.

My invention is of comparatively simple construction; operates continuously and automatically; is very efficient and is not liable to get out of order.

Having thus described the invention, what I claim is:

1. In a machine of the character described, a turn-table provided with a series of openings, molds pivoted eccentrically in said opening by means of pintles seated in the turn-table and extending through the mold, and a ring encircling said turn-table to hold the pintles in place.

2. In a machine of the character described, a glass cut-off mechanism comprising stationary radially disposed blades having straight cutting edges and radially disposed cutting blades having straight cutting edges, and means to rotate one set of said blades, substantially as described.

3. In a machine of the character described, a turn-table provided with a series of openings, mold members in said openings, a glass cut-off device comprising an adjustable stationary member having radial blades, and a relatively rotatable member provided with radial blades, and means for rotating the said member, substantially as described.

4. In a machine of the character described, a turn-table provided with a series of openings, mold members in said openings, a reciprocating plunger, a cylinder, a piston therein, a piston rod connected to said piston, a lever, a molding plunger depressed by said lever, a spring for retracting said plunger, a compressed air pipe leading to said cylinder, a valve in said pipe, and means for operating said valve to establish communication between the compressed air pipe and the cylinder, and between the valve and the outer atmosphere, substantially as described.

5. In a machine of the character described, a turn table provided with a series of openings, molds pivoted eccentrically in said openings, a rod extending through each of the molds eccentrically, the ends of said rods being pivoted in the turn table, and a hoop passing around said turn table to hold said rods in place.

In testimony whereof, I affix my signature in presence of two witnesses.

FRANK J. HOUK.

Witnesses:
 HENRY ALLEN GARVERICK,
 MELVILLE C. DEMLER.